United States Patent
Kuzma et al.

(10) Patent No.: US 11,159,334 B2
(45) Date of Patent: Oct. 26, 2021

(54) DISTRIBUTION OF SOFTWARE SIGNATURES USING A COMMUNITY CATALOG BASED ON BLOCKCHAIN

(71) Applicant: International Business Machines Corporation, Armonk, NY (US)

(72) Inventors: Jagoda Kuzma, Cracow (PL); Bartlomiej T. Malecki, Slomniki (PL); Piotr Padkowski, Lodz (PL); Marek Peszt, Cracow (PL); Piotr J. Walczak, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 15/284,684

(22) Filed: Oct. 4, 2016

(65) Prior Publication Data
US 2018/0096042 A1    Apr. 5, 2018

(51) Int. Cl.
*H04L 9/32* (2006.01)

(52) U.S. Cl.
CPC .......... *H04L 9/3297* (2013.01); *H04L 9/3236* (2013.01); *H04L 2209/38* (2013.01)

(58) Field of Classification Search
CPC ......... G06F 17/30575; G06F 17/30289; H04L 9/3297; H04L 9/3236; H04L 2209/38
See application file for complete search history.

(56) References Cited

U.S. PATENT DOCUMENTS

| | | | |
|---|---|---|---|
| 2014/0259168 A1* | 9/2014 | McNamee | G06F 21/566 726/23 |
| 2015/0089473 A1 | 3/2015 | Gocek et al. | |
| 2015/0363194 A1 | 12/2015 | Chmiel et al. | |
| 2016/0026449 A1 | 1/2016 | Gierlak et al. | |
| 2016/0028552 A1 | 1/2016 | Spanos et al. | |
| 2017/0279818 A1* | 9/2017 | Milazzo | H04L 63/1416 |
| 2018/0006831 A1* | 1/2018 | Toll | G06Q 40/04 |
| 2018/0032383 A1* | 2/2018 | Surcouf | G06F 21/602 |
| 2018/0173568 A1* | 6/2018 | El-Moussa | G06F 9/46 |
| 2018/0191502 A1* | 7/2018 | Karame | G06Q 20/065 |

OTHER PUBLICATIONS

"Blockchain (database)", https://en.wikipedia.org/wiki/Blockchain_(database), retrieved from the Internet Aug. 17, 2016, 8 pages.
"Proof of work", Bitcoin Wiki, https://en.bitcoin.it/wiki/Proof_of_work, retrieved from the Internet Aug. 17, 2016, 2 pages.

* cited by examiner

*Primary Examiner* — Hosain T Alam
*Assistant Examiner* — Anthony G Gemignani
(74) *Attorney, Agent, or Firm* — Francis Lammes; Stephen J. Walder, Jr.; Jeffrey S. LaBaw

(57) ABSTRACT

A mechanism is provided for adding software signatures to a software catalog may be provided. The software catalog comprises a vendor-maintained software catalog section, a user-maintained software catalog section, and a community-maintained software catalog section. The mechanism scans a system using a software asset management tool. The mechanism adds a new software signature to the community-maintained software catalog section via a Blockchain transaction. An acceptance of the signature into the community-maintained software catalog section is based on a received Blockchain proof-of-work message.

20 Claims, 5 Drawing Sheets

DISTRIBUTION OF SOFTWARE SIGNATURES USING A COMMUNITY CATALOG BASED ON BLOCKCHAIN

BACKGROUND

The present application relates generally to adding software signatures to a software catalog, and more specifically to mechanisms for distributing software signatures using a community maintained section of a software catalog based on Blockchain technology.

Nowadays, a software catalog is an indispensable part of a software asset management tool (SAM). Software asset management tools are used to survey and manage software packages and elements thereof on a computer system. Typically, a scanning module of the software asset management tool searches through a file system of a computer system for installed software elements. To be able to correctly discover installed software products it is required to scan the entire computer system, detect what is installed and compare each found software element with a signature in a software catalog. The software catalog may comprise signatures of a large plurality of potentially installed software elements.

Companies that produce software asset management tools typically also develop a base software catalog with a limited number of signatures of known software products, components, etc. Such a vendor-maintained software catalog is rather hard to maintain because, e.g., new versions and releases of software products are released every day. It may be completely impossible to keep the software catalog up-to-date and ensure a proper quality of the signatures.

Currently, the basic solution for this problem lies in allowing also user-maintained software signatures for those software products or software elements having a signature not matching an entry in the software catalog. In a next, manual step a user may submit a newly discovered signature to the software catalog vendor for approval. The software catalog vendor then spreads a new version of the software catalog to its customers. Such a process is costly for the software catalog user because typically an update to the software signatures may fall under the support provided by the software catalog vendor. Additionally, the turnaround time for the process of updating the software catalog with new software signatures is far below expectations.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for adding software signatures to a software catalog. In the illustrative embodiment, the software catalog may comprise a vendor-maintained software catalog section, a user-maintained software catalog section and a community-maintained software catalog section. The illustrative embodiment scans a computer system using a software asset management tool. The illustrative embodiment adds a new software signature to the community-maintained software catalog section via a Blockchain transaction. In the illustrative embodiment, an acceptance of the signature into the community-maintained software catalog section may be based on a received Blockchain proof-of-work message.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited. The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
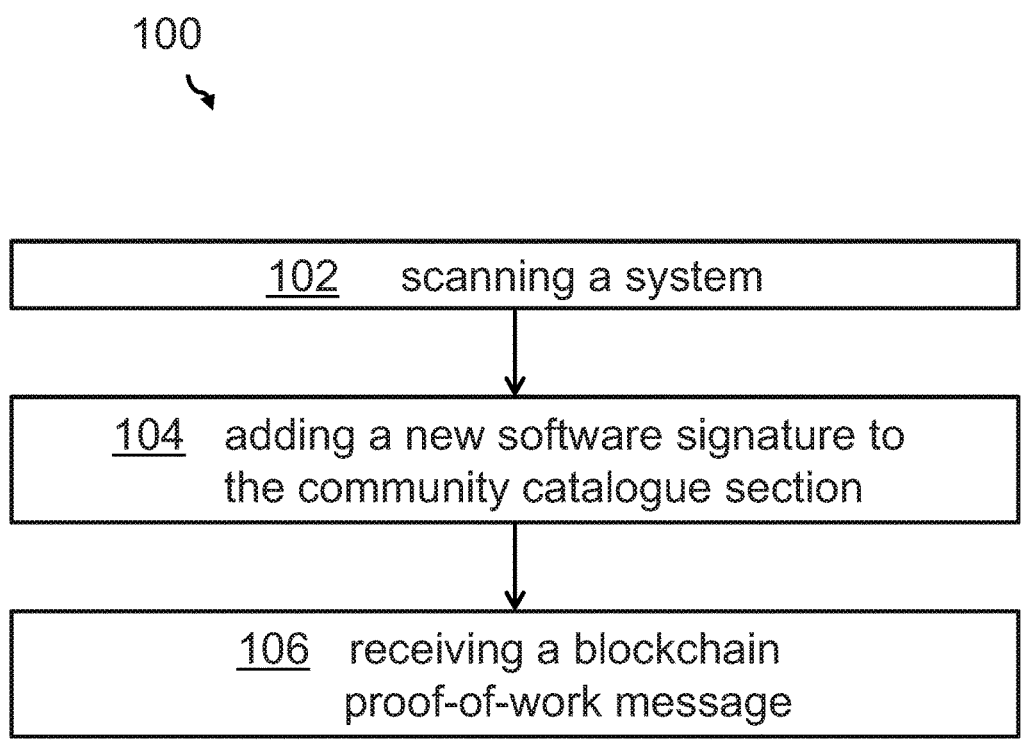
FIG. 1 shows a block diagram of an embodiment of the inventive method for adding software signatures to a software catalog in accordance with an illustrative embodiment.

In the context of this description, the following conventions, terms and/or expressions may be used:

The term 'software signature' may denote a piece of code—in particular software—which may comprise a method of how to find and identify a specific software program or software element. It may not be intermixed with a digital signature or a simple binary pattern. Tools may be used to develop or create a yet unknown software signature manually or semi-automated.

The term 'software catalog' may denote a collection of software signatures based on which a software asset management tool may identify software that may be discovered if a software asset management tool searches through, i.e., scans, a file system in order to identify software installed on the underlying computer system. A software catalog may have different sections, each of which may comprise software signatures of a different type. There may be a section reserved for software signatures delivered by the vendor of the software asset management tool; there may be another section in which only user generated and maintained software signatures may be stored. As part of the current invention, a third section may be reserved for storing community-based or community-maintained software signatures.—In this context, the term 'community' may denote any collection of computer systems being installed on one premise or location of one single enterprise or, different locations belonging to one or more user(s) or groups of users or enterprises.

The term 'scanning a system' may denote a process of searching software products or software elements being installed on a computer system.

The term 'software asset management tool' may denote a tool instrumental for software asset management, i.e., ensuring to be compliant with software license regulations. The software asset management tool may search for installed software, i.e., scan, on a computer system or a group of computer systems. The software asset management tool may be executed locally on every computer system; alternatively, there may be a central, server-based version of a software asset management tool potentially supported by scan agents on connected computer systems.

The term 'vendor-maintained' may denote that a part of a software catalog may be updated by a vendor, e.g., a vendor of a software asset management tool.

The term 'user-maintained' may denote that another part of the software catalog may be maintained by a user or owner of a computer system. This section of the software catalog may not be updated by the vendor of the software asset management tool.

The term 'community-maintained' may denote a disjointed third part of a software catalog which may receive and confirm updates proposed by a community of software systems and not by the vendor of the SAM (software asset management tool).

The term 'non-matching software component' may denote a software component which may be installed on the computer system for which no software signature may exist in a related software catalog.

The term 'Blockchain challenge' may denote a part of a Blockchain transaction step. The term 'Blockchain' may denote originally the known distributed database that may maintain a continuously growing list of data records hardened against tampering and revision. It may consist of data structure blocks, which may hold exclusively data. In the context of this document, the term Blockchain challenge may refer to a software signature being designed or developed by a user/operator on his computer system and sent to other computer systems. The challenge may need a confirmation from one or more other computer systems, or software asset management tools, respectively.

It may also be noted that a system may be referred to a large plurality of different implementations of computing systems. It may be denoted as computing system, end-point, computer system, but it could as well be a server, a storage system, a mobile device, a subsystem of a computer and so on.

It may also be noted that the step of the Blockchain transaction and to proof-of-work message may be initiated, generated and/or executed by the enhanced version of the proposed software asset management tool.

Furthermore, it may be noted that all members of the here relevant community of computer systems may have installed the enhanced-software asset management tool being capable of handling modified Blockchain transaction steps, as well as generating, receiving and using proof-of-work messages.

The proposed method for adding software signatures to a software catalog may offer multiple advantages and technical effects:

It may release individual users of computer systems or operators from maintaining and organizing private software signatures for those software products or software elements for which no software signature may be made available from the vendor of the software asset management tool. There may be several reasons for not providing software signatures for certain software products or elements. The vendor of the software asset management tool may not have any information about newly available software products, versions or releases or, the updates may come too quickly so that the software asset management tool vendor may not be fast enough to update his software catalog and redistribute it to its customers.

Additionally, it makes use of the community concept under which known facts of the availability of new software signatures within one or more community members may also be used or "learnt" by other participants in the community. Thus, knowledge about a certain fact may be distributed among the community. The systems belonging to such a community may be enabled to increase their capabilities mutually and automatically without an intervention from a central server. Additionally, also the vendor of the software asset management tool may be part of the community so that delivered software catalogs to new customers, which may not yet be part of the community, may receive an up-to-date software catalog comprising a far larger number of confirmed software signatures of known software products or software elements. In turn, this may reduce the need for user-maintained software signatures as well as a lower number of user-maintained software signatures within a software catalog to be used by a software management tool.

The community updates also release operators from installing new versions of the vendor-maintained part of the software catalog.

In the following, more embodiments of the here proposed concept are discussed. All features of the method may also be applicable to the related system.

According to one preferred embodiment of the method, the Blockchain transaction step may comprise creating a new software signature related to a non-matching software component, identified during the scanning of the computer system, and sending the new software signature, in particular community systems, as a Blockchain challenge as part of the Blockchain transaction step, in particular the modified Blockchain transaction step. This means that a software signature may be generated for a software component for which no matching software signature may be found in the entire software catalog available to the software asset management tool, i.e., in the vendor-maintained section, in the user-maintained section and in the community-maintained section of the software catalog. Thus, the known challenging mechanism of the known Blockchain transaction may here be modified in the sense of using a software signature as a challenge to other computer systems executing another copy of the enhanced software asset management tool.

According to a further preferred embodiment of the method, the Blockchain proof-of-work message may be generated by the software asset management tool—on another computer system belonging to the community—if a scanning of the computer system may reside in a lower number of unmatched software components when using the new software signature, which was received, in addition to the software catalog not comprising the new software signature. Thus, in other words: if a scan of a computer system using a software asset management tool discovers more software products or software elements when using the received software signature as part of the Blockchain transaction step from another computer system, it may be a confirmation or proof for the validity and applicability of the software signature. Thus, a proof-of-work message—in the sense of a Blockchain transaction—may be generated and sent back to the computer system from which the new software signature may have been received as part of the Blockchain challenge. With this, the loop may be closed and the new software signature may be added to the community-maintained section of the software catalog.

According to an advantageous embodiment, the method may optionally also comprise sending the proof-of-work message after a separate—in particular, manual—confirmation step. Such a manual confirmation step may be performed by an operator or user in order to verify the validity of the new software signature. The quality of the community-maintained section of the software catalog may be increased this way.

According to one permissive of the method, the adding the new software signature to the community software catalog section may be performed only if the proof-of-work message is received within a predefined time-period after an initiation of the Blockchain transaction step; otherwise, the software signature is not added to the community section of the software catalog. This may ensure that a complete modified Blockchain transaction step—in the sense of this document—may be executed in a predefined time period and not be open for an unlimited amount of time.

According to an additionally advantageous embodiment of the method, the adding the new software signature to the community software catalog section may be performed only after a predefined number of proof-of-work messages have been received, in particular from a plurality of community members. Also this may increase the quality of the community-maintained section of the software catalog because a plurality of proof-of-work messages may be received from different computing systems having confirmed the validity of the new software signature for a newly discovered software product or software component.

According to an optional embodiment of the method, the Blockchain transaction step may comprise receiving the new software signature—in particular from another community computer system—and putting the received new software signature in quarantine. This step may guarantee that the newly received software signature is not included into the community-maintained section of the software catalog immediately after receiving. The scan of the software asset management tool may first be executed in order to confirm or revoke the new software signature, i.e., confirm it after a related software component has been found. Otherwise, no proof-of-work message would be generated. Thus, the modified Blockchain transaction step may not be completed.

According to one advanced embodiment of the method, the Blockchain transaction step may only be initiated after a plurality—two, three or more—of new software signatures have been be combined in a block of new software signatures. Thus, none of the newly discovered software signature may initiate a modified Blockchain transaction step. Instead, the system, i.e., software asset management tool, may thrive for efficiency and combine a plurality of newly discovered software signatures. This may, e.g., be performed after a complete scan for new software elements or components of a computer system may have been performed. This may reduce the number of open modified Blockchain transaction steps, as well as potentially the number of proof-of-work messages, because also these may be combined in confirmation block messages.

According to one further advanced embodiment of the method, a proof-of-work block message may only be generated by the software asset management tool—in particular on a different computer system belonging to the community—if software components are found, during a scanning of the system, relating to a predefined number of software signatures out of the block of new software signatures using the software asset management tool. Thus, proof-of-work messages may be combined for all new software signatures being comprised in a block of the modified Blockchain transaction step, or only for a subset of such block of newly discovered software signatures. Thus, the overall performance and the overall overhead of the newly proposed method may be fine-tuned using different variables.

According to an alternative enhanced embodiment of the method, an individual proof-of-work message may be generated by the software asset management tool if a software component is found relating to a signature out of the block of new software signature by scanning of the system using the software asset management tool. I.e., one proof-of-work message may be generated and sent for each newly confirmed software signature during a scan of the system. It may be noted that such a solution may require more network bandwidth than the previous solution.

According to a further advantageous embodiment of the method, the acceptance of each of the new software signatures of the block of new software signatures to the community-maintained software catalog section may only be performed after a predefined number of proof-of-work block messages has been received relating to the same software signature. This may enhance the reliability of entries in the community-based section of the software catalog.

In the following, a detailed description of the figures will be given. All instructions in the figures are schematic. Firstly, a block diagram of an embodiment of the inventive method for adding software signatures to a software catalog is given. Afterwards, further embodiments, as well as embodiments of the system for adding software signatures to a software catalog, will be described.

FIG. 1 shows a block diagram of an embodiment of the method 100 for adding software signatures to a software catalog by scanning, 102, a system or computer system in accordance with an illustrative embodiment. The system may be any computerized system like, a personal computer (PC), end-point, a mobile device, a smartphone, a server, a storage system, etc. The scan is being done by a software asset management tool. The software catalog comprises a vendor-maintained software catalog section, a user-maintained software catalog section and a community-maintained software catalog section.

The method comprises also adding, 104, a new software signature to the community-maintained section of the software catalog via a Blockchain transaction step, in particular, a modified Blockchain transaction step. An acceptance of the software signature into the community-maintained software catalog section is based on a received Blockchain proof-of-work message, 106. Thus, the known Blockchain proof-of-work mechanism may be used in a slightly modified form. It may be executed by the SAM tool being executed on all other systems of the community.

Figure 2:
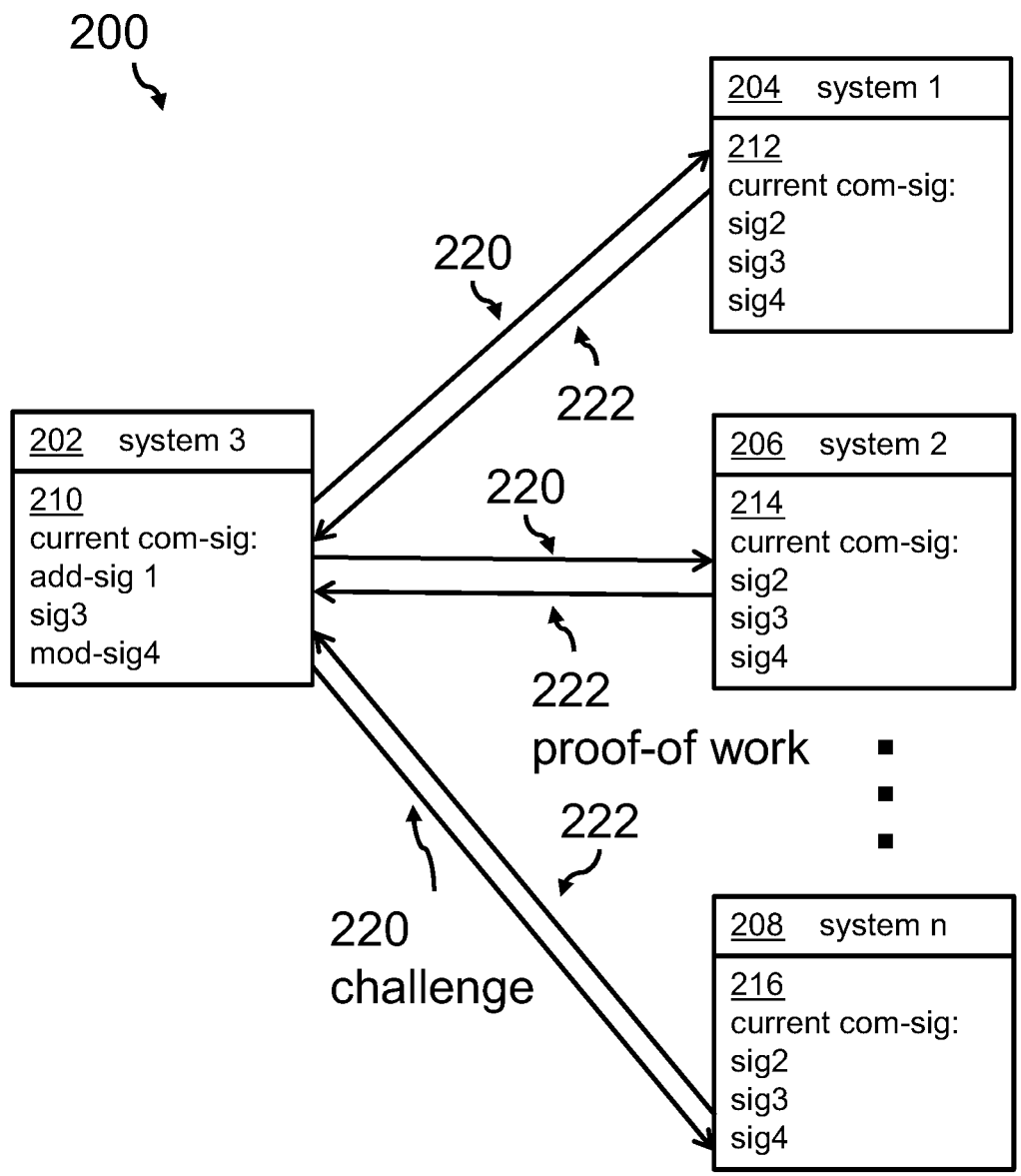
FIG. 2 shows a block diagram of an embodiment of a community of a series of systems in accordance with an illustrative embodiment.

FIG. 2 shows a block diagram 200 of an embodiment of a community of a series of systems 1, 2, 3, . . . , n or computing systems 202, 204, 206, 208 in accordance with an illustrative embodiment. Each computing system 202, 204, 206, 208 may use the enhanced software asset management tool maintaining a software catalog having three sections: a user-maintained section, a vendor-maintained section and a community-maintained section. Only the community-maintained sections are shown as reference numerals 210, 212, 214, 216. The community-maintained sections of the software catalog of the systems 204, 206, 208 comprise software signature sig2, sig3, sig4. Additionally, a scan of system 3 or, computer system 202 may have unveiled a new software signature named add-sig1 and a modified software signature mod-sig4. The community-maintained section of the software catalog may be implemented as a chain of blocks which contains software signatures and other relevant information of a software product or software component.

The newly discovered software signature add-sig1 may, e.g., be created by a software asset administrator and may be saved to the user-maintained private section of the software catalog. The software asset management tool uses the signature only for local software asset management purposes. However, the user may also decide to share his signature with community members.

In the classical Blockchain concept, the challenge is a description of a candidate to become the new block. In the here proposed approach, the shared software signature is a block proposal (challenge) which is distributed, 220, across all software asset management tools being part of the community in the infrastructure. In one of the proposed embodiments, the challenge contains the to-be-shared software signature, the address/uuid (universally unique identifier) of the software asset management tool that distributes the software signature, and the address/uuid of the software asset management tool which provides a proof-of-work message if the proof was successful.

After the challenge is distributed, 220, across the software asset management tools of the community, each software asset management tool receives it and tries to validate it by matching the new software signatures with already collected software facts not correlated yet with any software product or software component. Such software products or software components may be classified as unorganized software. If the newly received software signature may be confirmed by the enhanced software management tool (proof-of-work), a response may be sent back, 222, to the challenging system 202 (i.e., modified version of the Blockchain protocol) as proof-of-work message.

Thus, in contrast to the classical approach of the Blockchain concept, in which the proof-of-work is simply generating a hash value as long as the required number of leading zeros is in place, the here proposed proof-of-work message is finding a match between the software signature and a raw (unmatched) discovered software product or software component.

The proof-of-work message may comprise a modified block, i.e., modified proposal or challenge, by which the newly discovered software signature may be committed to the community-maintained software catalog. This may be performed by all enhanced software asset management tools of the community.

Figure 3:
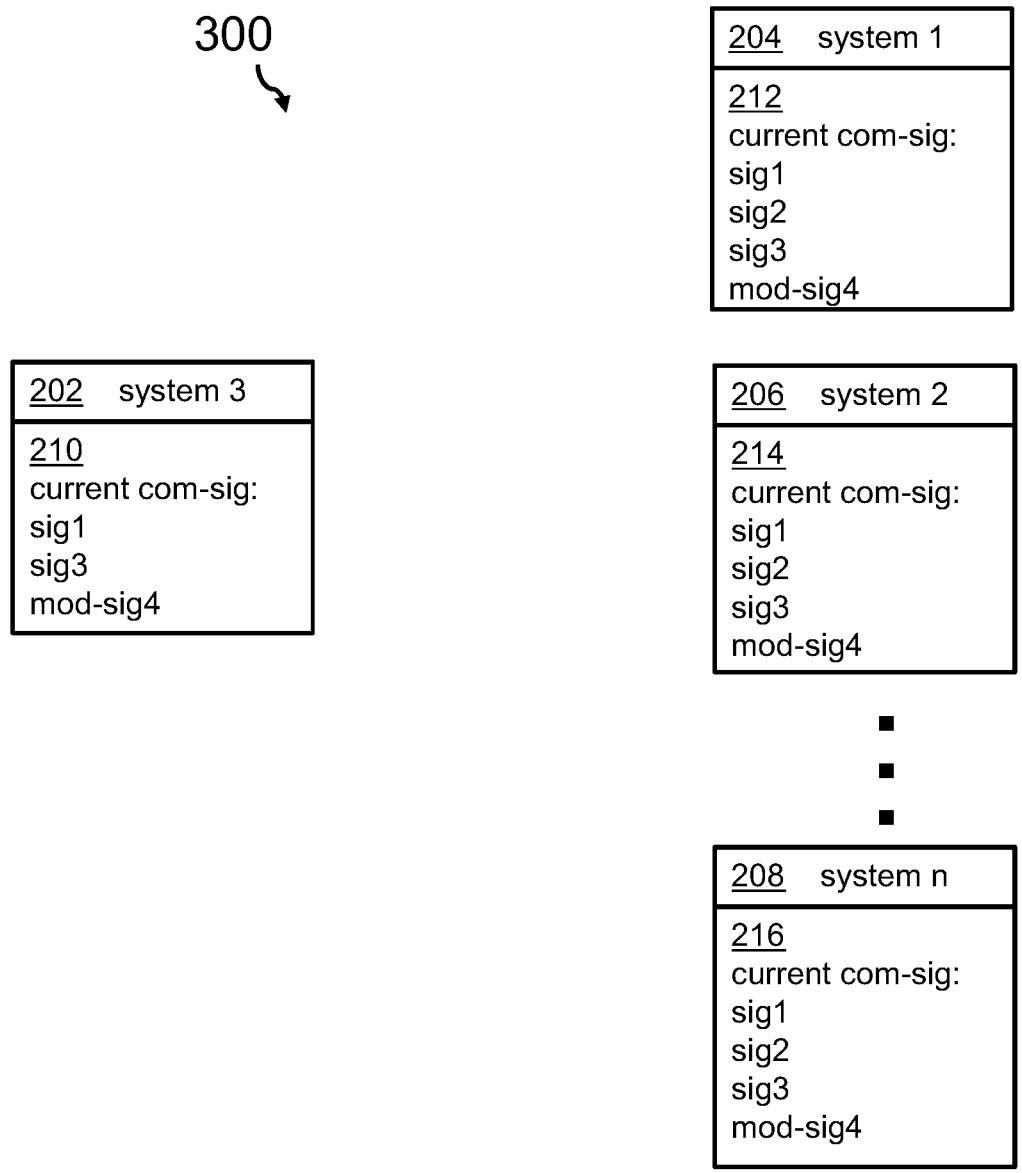
FIG. 3 shows a block diagram of an embodiment of the computer systems of FIG. 2 with modified community-maintained sections.

FIG. 3 shows a block diagram 300 of the computer systems of FIG. 2 with modified community-maintained sections, shown as reference numerals 210, 212, 214, 216, of the software catalog in the systems 202, 204, 206, 208, respectively. Each of the community-maintained sections 210, 212, 214, 216 of the software catalog may now comprise the complete list of software signatures: sig1, sig2, sig3, as well as the modified signature for, namely mod-sig4.

Even if the software signature being transmitted to other software asset management tools was not added to the community-maintained section of the software catalog, the software signature of the discovered product by the Blockchain transaction step initiating system may put the software signature of the newly discovered software product or software component into the user-maintained section of the software catalog. In other words, in case when no suitable number of proof-of-work messages has been generated within a required time frame by the community, the software asset management server that proved the software signature may copy it into its user-maintained section of the software catalog.

Figure 4:
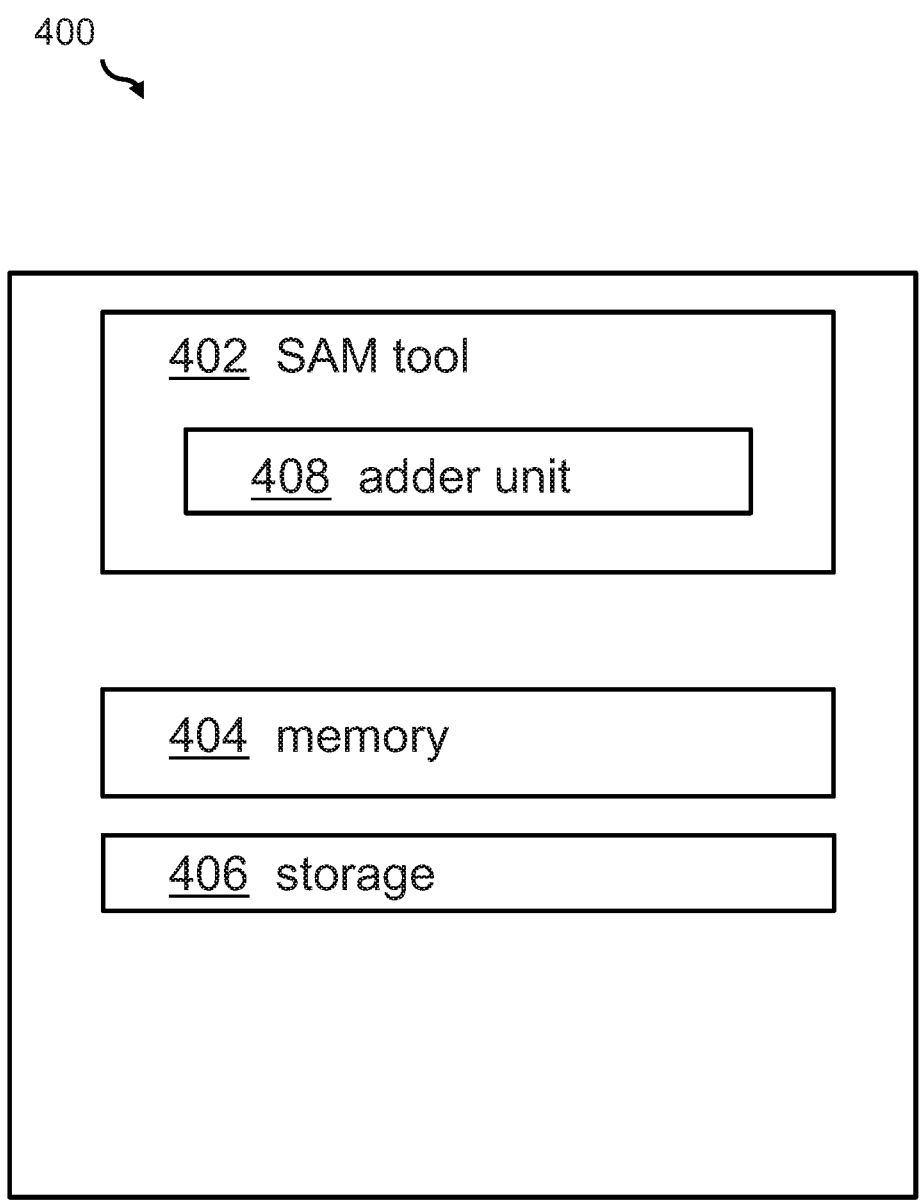
FIG. 4 shows an embodiment of the system for adding software signatures to a software catalog.

FIG. 4 shows an embodiment of the system for adding software signatures to a software catalog. It may also be denoted as a signature exchange transaction system. The system 400 for adding software signatures to a software catalog by scanning a system comprises a software asset management tool 402, a memory 404 and, storage 406. The software asset management tool 402 is adapted for storing a software catalog in the storage system 406. The software catalog comprises a vendor-maintained software catalog section, a user-maintained software catalog section and a community-maintained software catalog section. The software asset management tool comprises an adder unit 408 adapted for adding a new software signature to the community software catalog section via a Blockchain transaction step. The adder unit is also adapted for an acceptance of the signature into the community-maintained software catalog section after a reception of Blockchain proof-of-work message.

Figure 5:
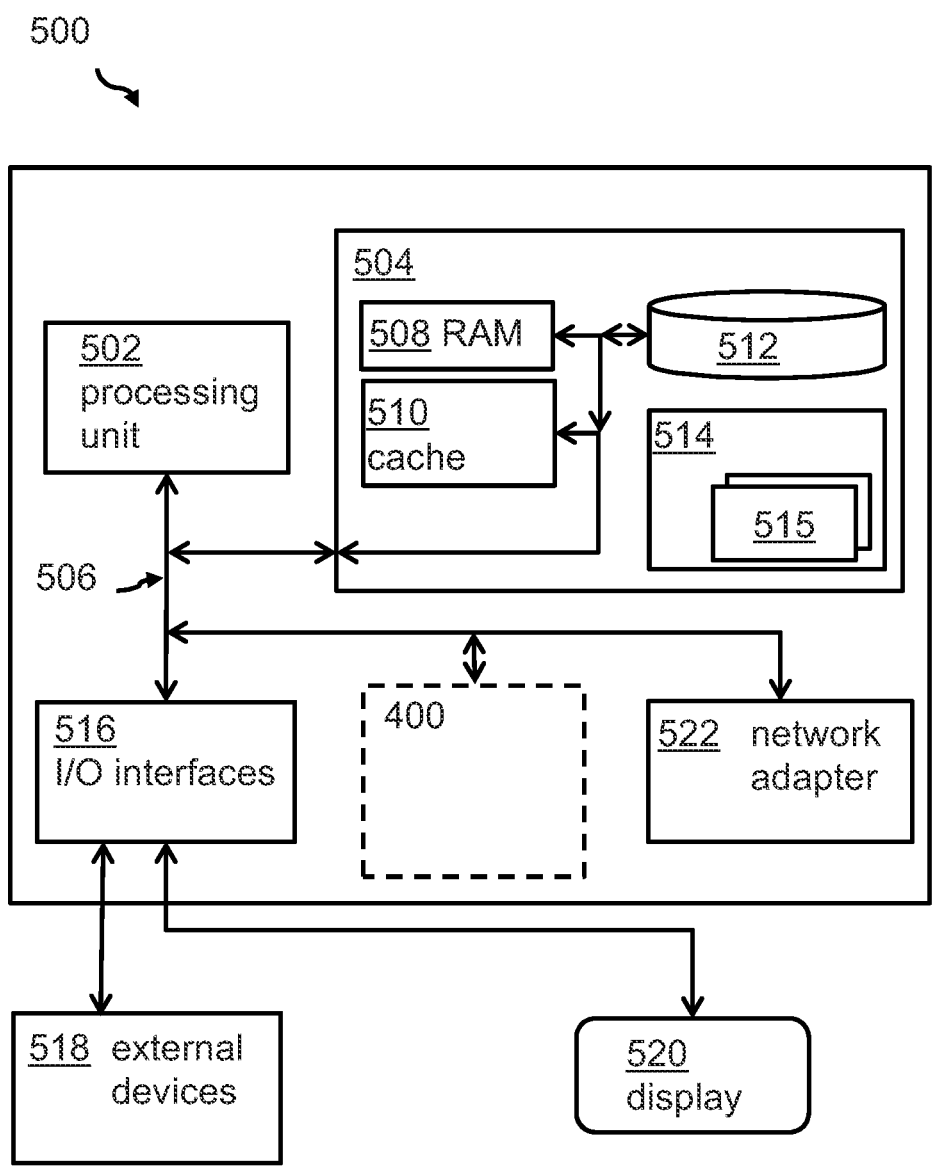
FIG. 5 shows an embodiment of a computing system comprising the system for adding software signatures to a software catalog.

Embodiments of the invention may be implemented together with virtually any type of computer, regardless of the platform being suitable for storing and/or executing program code. FIG. 5 shows, as an example, a computing system 500 suitable for executing program code related to the proposed method.

The computing system 500 is only one example of a suitable computer system and is not intended to suggest any limitation as to the scope of use or functionality of embodiments of the invention described herein. Regardless, computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couples various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

Program/utility 514, having a set (at least one) of program modules 515, may be stored in memory 504 by way of example, and not limitation, as well as an operating system, one or more application programs, other program modules, and program data. Each of the operating system, one or more application programs, other program modules, and program data or some combination thereof, may include an implementation of a networking environment. Program modules 515 generally carry out the functions and/or methodologies of embodiments of the invention as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 516. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, a system 400 for adding software signatures to a software catalog may be attached to the bus system 506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for adding software signatures to a software catalog, wherein the software catalog comprises a vendor-maintained software catalog section, a user-maintained software catalog section, and a community-maintained software catalog section, the method comprising:
receiving, by a first software asset management tool on a first computing system, a new software signature that has been added to a community-maintained software catalog section of a second computing system from a second software assessment management tool on the second computing system via a Blockchain transaction;
scanning, by the first software management tool, the first computing system for a software component installed on the first computing system for which no software signature exists and that relates to the new software signature; and
responsive to identifying the software component installed on the first computing system for which no software signature exists and that relates to the new software signature, adding, by the first software management tool, the new software signature to the community-maintained software catalog section of the first computing system via the Blockchain transaction, wherein an acceptance of the new software signature into the community-maintained software catalog section of the first computing system is based on sending, by the first software management tool, a Blockchain proof-of-work message to the second software assessment management tool on the second computing system.

2. The method of claim 1, wherein
the first software management tool receives the new software signature as a Blockchain challenge within the Blockchain transaction.

3. The method of claim 1, wherein the Blockchain proof-of-work message is generated by the first software asset management tool if the scanning the first computing system results in a lower number of unmatched software components when using the new software signature, which was received, in addition to the community-maintained software catalog not comprising the new software signature.

4. The method of claim 3, further comprising:
sending, by the first software management tool, the Blockchain proof-of-work message to the second software assessment management tool on the second computing system after a separate confirmation.

5. The method of claim 1, wherein the adding of the new software signature to the community-maintained software catalog section of the first computing system is performed only if the Blockchain proof-of-work message is sent to the second software assessment management tool on the second computing system within a predefined time-period after an initiation of the Blockchain transaction.

6. The method of claim 1, wherein the adding the new software signature to the community-maintained software catalog section of the first computing system is performed only after a predefined number of Blockchain proof-of-work messages have been sent to the second software assessment management tool on the second computing system.

7. The method of claim 1, wherein the Blockchain transaction comprises:
putting, by the first software management tool, the new software signature in quarantine.

8. The method of claim 1, wherein the Blockchain transaction is initiated after a plurality of new software signatures are combined in a block of new software signatures.

9. The method of claim 8, wherein the Blockchain proof-of-work message is generated by the first software asset management tool if software components are found, during the scanning of the system, relating to a predefined number of software signatures out of the block of new software signatures using the first software asset management tool.

10. The method of claim 8, wherein an individual Blockchain proof-of-work message is generated by the first software asset management tool if a software component is found relating to a new software signature out of the block of new software signatures by scanning of the system using the first software asset management tool.

11. The method of claim 8, wherein the acceptance of each new software signature in the block of new software signatures to the community-maintained software catalog section of the first computing system is performed after a predefined number of Blockchain proof-of-work messages has been sent to the second software assessment management tool on the second computing system.

12. A system for adding software signatures to a software catalog, wherein the software catalog comprises a vendor-maintained software catalog section, a user-maintained software catalog section, and a community-maintained software catalog section, the system comprising:
a processor; and
a memory coupled to the processor, wherein the memory comprises instructions which, when executed by the processor, cause the processor to:
receive, by a first software asset management tool on a first computing system, a new software signature that has been added to a community-maintained software catalog section of a second computing system from a second software assessment management tool on the second computing system via a Blockchain transaction;
scan, by the first software management tool, the first computing system for a software component installed on the first computing system for which no software signature exists and that relates to the new software signature; and
responsive to identifying the software component installed on the first computing system for which no software signature exists and that relates to the new software signature, add, by the first software management tool, the new software signature to the community-maintained software catalog section of the first computing system via the Blockchain transaction, wherein an acceptance of the new software signature into the community-maintained software catalog section of the first computing system is based on sending, by the first software management tool, a Blockchain proof-of-work message to the second software assessment management tool on the second computing system.

13. The system of claim 12, wherein
the first software management tool receives the new software signature as a Blockchain challenge within the Blockchain transaction.

14. The system of claim 12, wherein the Blockchain proof-of-work message is generated by the first software asset management tool if the scanning of the first computing system results in a lower number of unmatched software components when using the new software signature, which was received, in addition to the community-maintained software catalog not comprising the new software signature.

15. The system of claim 12, wherein the instructions to add the new software signature to the community-maintained software catalog section of the first computing system is performed only if the Blockchain proof-of-work message is sent to the second software assessment management tool on the second computing s stem within a predefined time-period after an initiation of the Blockchain transaction or after a predefined number of Blockchain proof-of-work messages have been sent to the second software assessment management tool on the second computing system.

16. The system of claim 12, wherein the instructions cause the processor to initiate the Blockchain transaction after a plurality of new software signatures are combined in a block of new software signatures.

17. The system of claim 16, wherein the instructions cause the processor to generate the Blockchain proof-of-work message by the first software asset management tool if software components are found, during the scanning of the system, relating to a predefined number of software signatures out of the block of new software signatures using the first software asset management tool.

18. The system of claim 16, wherein the instructions cause the processor to generate an individual Blockchain proof-of-work message by the first software asset management tool if a software component is found relating to a new software signature out of the block of new software signatures by scanning of the system using the first software asset management tool.

19. The system of claim 16, wherein the instructions cause the processor to perform the acceptance of each new software signature in the block of new software signatures to the community-maintained software catalog section of the first computing system after a predefined number of Blockchain proof-of-work messages has been sent to the second software assessment management tool on the second computing system.

20. A computer program product comprising a computer readable storage medium having a computer readable program tor adding software signatures to a software catalog, wherein the software catalog comprises a vendor-maintained software catalog section, a user-maintained software catalog section, and a community-maintained software catalog section stored therein, wherein the computer readable program, when executed on a computing device, causes the computing device to:

receive, by a first software asset management tool on a first computing system, a new software signature that has been added to a community-maintained software catalog section of a second computing system from a second software assessment management tool on the second computing system via a Blockchain transaction;

scan, by the first software management tool, the first computing system for a software component installed on the first computing system for which no software signature exists and that relates to the new software signature; and responsive to identifying the software component installed on the first computing system for which no software signature exists and that relates to the new software signature, add, by the first software management tool, the new software signature to the community-maintained software catalog section of the first computing system via the Blockchain transaction, wherein an acceptance of the new software signature into the community-maintained software catalog section of the first computing system is based on sending, by the first software management tool, a Blockchain proof-of-work message to the second software assessment management tool on the second computing system.

* * * * *